United States Patent
Onishi et al.

(10) Patent No.: US 8,453,446 B2
(45) Date of Patent: Jun. 4, 2013

(54) EXHAUST GAS CONTROL SYSTEM FOR INTERNAL COMBUSTION ENGINE AND METHOD FOR CONTROLLING THE SAME

(75) Inventors: Tomomi Onishi, Susono (JP); Akio Matsunaga, Nishikamo-gun (JP); Shigeki Nakayama, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 981 days.

(21) Appl. No.: 12/522,749

(22) PCT Filed: Jan. 23, 2008

(86) PCT No.: PCT/IB2008/000143
§ 371 (c)(1),
(2), (4) Date: Jul. 10, 2009

(87) PCT Pub. No.: WO2008/090445
PCT Pub. Date: Jul. 31, 2008

(65) Prior Publication Data
US 2010/0000213 A1    Jan. 7, 2010

(30) Foreign Application Priority Data

Jan. 25, 2007 (JP) ................................ 2007-014959

(51) Int. Cl.
F02B 33/44 (2006.01)
F02B 77/08 (2006.01)
F02B 47/08 (2006.01)
F02M 25/07 (2006.01)
F02D 17/04 (2006.01)

(52) U.S. Cl.
USPC .................. 60/605.2; 701/108; 123/198 DB; 123/568.21

(58) Field of Classification Search
USPC .................. 60/605.2; 701/108; 123/568.14, 123/568.21, 198 DB
See application file for complete search history.

(56) References Cited

U.S. PATENT DOCUMENTS 5,927,075 A * 7/1999 Khair .......................... 60/605.2
5,967,115 A * 10/1999 Konopka et al. ......... 123/568.14
(Continued)

FOREIGN PATENT DOCUMENTS

EP 1 004 760 A2 5/2000
EP 1 674 698 A2 6/2006
(Continued)

OTHER PUBLICATIONS

A machine translation of Mori Shinji et al. (Pub. Number JP 2004-150319 A), published on May 27, 2004.*

(Continued)

Primary Examiner — Thai Ba Trieu
(74) Attorney, Agent, or Firm — Sughrue Mion, PLLC

(57) ABSTRACT

An exhaust gas control system for an internal combustion engine includes a turbocharger that includes a compressor arranged in an intake passage, and a turbine arranged in an exhaust passage; a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor; a low-pressure EGR valve that is provided in the low-pressure EGR passage, and that changes the flow passage area of the low-pressure EGR passage; and a valve control unit that executes an opening/closing control over the low-pressure EGR valve. When it is determined that the internal combustion engine is under a predetermined low-temperature environment, the low-pressure EGR valve is kept closed while the internal combustion engine is in the fuel-supply cutoff operation mode.

20 Claims, 8 Drawing Sheets

U.S. PATENT DOCUMENTS

| | | | |
|---|---|---|---|
| 7,296,561 B2 * | 11/2007 | Shirakawa et al. | 60/605.2 |
| 7,367,188 B2 * | 5/2008 | Barbe et al. | 60/605.2 |
| 7,380,400 B2 * | 6/2008 | Barbe et al. | 60/605.2 |
| 7,493,762 B2 * | 2/2009 | Barbe et al. | 60/605.2 |
| 7,836,693 B2 * | 11/2010 | Fujita et al. | 60/605.2 |
| 8,006,494 B2 * | 8/2011 | Nagae | 701/108 |
| 8,036,813 B2 * | 10/2011 | Tonetti et al. | 701/108 |
| 8,196,404 B2 * | 6/2012 | Onishi et al. | 60/605.2 |
| 8,316,828 B2 * | 11/2012 | Whitney et al. | 701/108 |
| 2006/0137660 A1 * | 6/2006 | Shirakawa et al. | 60/605.2 |
| 2007/0119172 A1 * | 5/2007 | Barbe et al. | 60/605.2 |
| 2007/0125081 A1 * | 6/2007 | Czarnowski et al. | 60/599 |
| 2007/0144501 A1 * | 6/2007 | Joergl et al. | 123/568.12 |
| 2009/0205617 A1 * | 8/2009 | Tonetti et al. | 123/568.18 |
| 2009/0223221 A1 * | 9/2009 | Onishi et al. | 60/603 |
| 2010/0000500 A1 * | 1/2010 | Shimizu et al. | 123/568.21 |
| 2012/0240557 A1 * | 9/2012 | Kawaguchi et al. | 60/278 |

FOREIGN PATENT DOCUMENTS

| | | |
|---|---|---|
| JP | 4-284147 A | 10/1992 |
| JP | 8-232784 A | 9/1996 |
| JP | 2002-276405 A | 9/2002 |
| JP | 2004-150319 A | 5/2004 |
| JP | 2005-76456 A | 3/2005 |
| JP | 2006-112414 A | 4/2006 |
| JP | 2006-183558 A | 7/2006 |
| JP | 2008-115780 A | 5/2008 |
| WO | 2007/129160 A1 | 11/2007 |

OTHER PUBLICATIONS

An English Certified translation of Toshitaka Minami (Pub. Number JP 2002-276405 A), published on Sep. 25, 2002.*

* cited by examiner

FIG.3

|   |    | THV1   | LPLV   | THV2 | HPLV |
|---|----|--------|--------|------|------|
| A | A1 | OPEN   | CLOSED | OPEN/CLOSED ||
|   | A2 | CLOSED |        |      |      |
| B |    | CLOSED | OPEN   |      |      |

FIG.4

|   |    | THV1   | LPLV   | THV2            | HPLV   |
|---|----|--------|--------|-----------------|--------|
| C | C1 | OPEN   | CLOSED | OPEN/<br>CLOSED | CLOSED |
|   | C2 | CLOSED |        |                 |        |
| D |    | CLOSED | OPEN   |                 |        |

FIG. 5

|   |    | THV1   | LPLV   | THV2   | HPLV |
|---|----|--------|--------|--------|------|
| E | E1 | OPEN   | CLOSED | CLOSED | OPEN |
|   | E2 | CLOSED |        |        |      |
| F |    | CLOSED | OPEN   |        |      |

FIG.6

|   | THV1   | LPLV   | THV2 | HPLV |
|---|--------|--------|------|------|
| G | CLOSED | CLOSED | OPEN | OPEN |
| H | CLOSED | OPEN   |      |      |

FIG.7

|   | THV1   | LPLV   | THV2 | HPLV        |
|---|--------|--------|------|-------------|
| I | OPEN   | CLOSED | OPEN | OPEN/CLOSED |
| J | CLOSED | OPEN   | OPEN | OPEN/CLOSED |

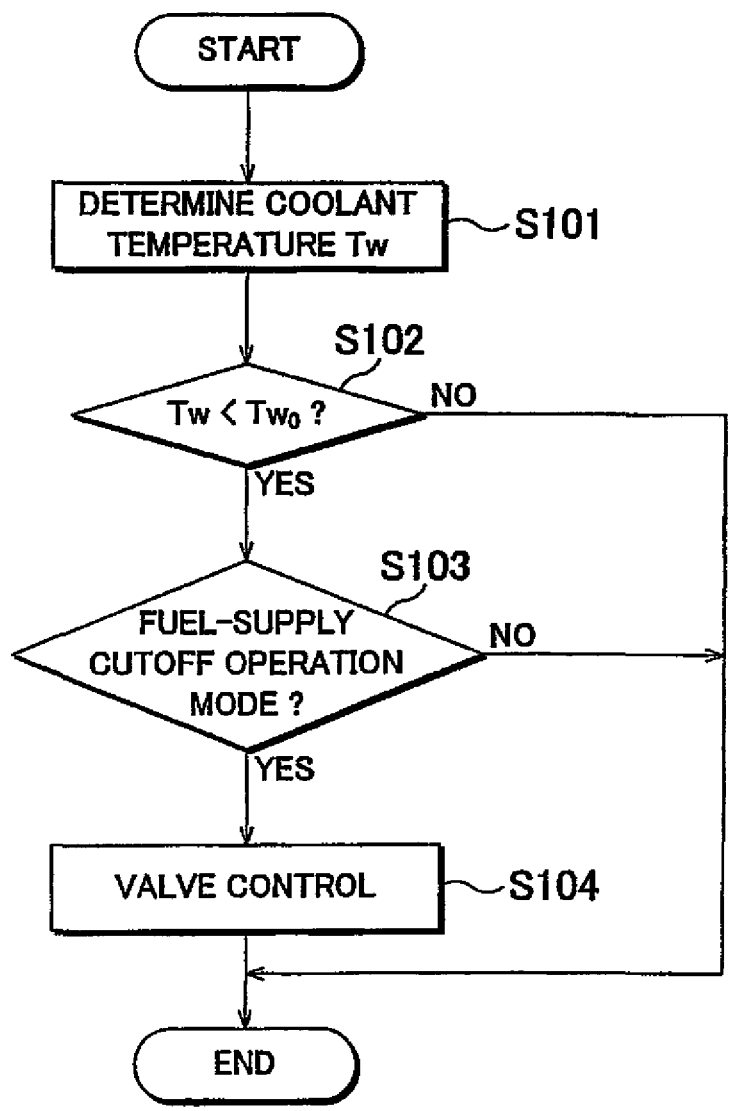

EXHAUST GAS CONTROL SYSTEM FOR INTERNAL COMBUSTION ENGINE AND METHOD FOR CONTROLLING THE SAME

BACKGROUND OF THE INVENTION

1. Field of the Invention

The invention relates to an exhaust gas control system for an internal combustion engine, and a method for controlling the same.

2. Description of the Related Art

As a technology for reducing the amount of nitrogen oxide (NOx) discharged from an internal combustion engine, exhaust gas recirculation (EGR) for causing a portion of the exhaust gas to flow into an intake system to recirculate it back to the internal combustion engine has been suggested. There is also a technology in which a high-pressure EGR unit and a low-pressure EGR unit are provided to an internal combustion engine with a turbocharger, and EGR is performed while the EGR unit used for EGR is changed between the high-pressure EGR unit and the low-pressure EGR unit or both the high-pressure EGR unit and the low-pressure EGR unit are used in combination, based on the operating state of the internal combustion engine, as described in, for example, Japanese Patent Application Publication No. 2005-076456 (JP-A-2005-076456). The high-pressure EGR unit recirculates a portion of the exhaust gas back to the internal combustion engine through a high-pressure EGR passage that provides communication between an exhaust passage, at a portion upstream of a turbine of a turbocharger, and an intake passage, at a portion downstream of a compressor of the turbocharger. The low-pressure EGR unit recirculates a portion of the exhaust gas back to the internal combustion engine through a low-pressure EGR passage that provides communication between the exhaust passage, at a portion downstream of the turbine, and the intake passage, at a portion upstream of the compressor.

Under the low-temperature environment, for example, when the engine coolant temperature is low or when the atmospheric temperature is low, if the low-temperature air passes through an intake system, such as an intake passage, or an EGR system, such as a low-pressure EGR passage, during the fuel-supply cutoff operation, the low-temperature air is taken in the internal combustion engine when the operation mode is switched from the fuel-supply cutoff operation mode to the normal operation mode. As a result, the temperature of the intake air may excessively decrease, resulting in inconveniences such as incomplete combustion and an increase in the discharge amount of hydrocarbon (HC).

Because the low-pressure EGR passage is relatively long, it takes relatively long time until the low-temperature gas that passes through the low-pressure EGR passage during the fuel-supply cutoff operation is replaced with the exhaust gas discharged from the internal combustion engine after the operation mode is switched from the fuel-supply cutoff operation mode to the normal operation mode. Therefore, the above-described inconveniences are likely to occur in the internal combustion engine provided with a low-pressure EGR unit.

To avoid such inconveniences, for example, Japanese Patent Application Publication No. 08-232784 (JP-A-07-232784) describes the following technology. According to the technology, a bypass passage through which the intake air bypasses an intercooler is provided to an intake passage. When an internal combustion engine is under a low-temperature environment, intake air is caused to flow through the bypass passage. In this way, excessive cooling of the intake air is suppressed. However, when this technology is employed, the bypass passage and a selector valve, which changes the flow path of the intake air between the path toward the intercooler and the path toward the bypass passage, needs to be provided to an intake system. This causes inconveniences such as a reduction in ease of mounting the internal combustion engine on a vehicle and an increase in cost.

SUMMARY OF THE INVENTION

The invention provides a technology for suppressing incomplete combustion and an increase in the discharge amount of hydrocarbon (HC) that are likely to occur when the operation mode of an internal combustion engine provided with a low-pressure EGR unit is switched from the fuel-supply cutoff operation mode to the normal operation mode under a low-temperature environment, while suppressing a reduction in ease of mounting the internal combustion engine on a vehicle and an increase in cost.

A first aspect of the invention relates to an exhaust gas control system for an internal combustion engine, which includes a turbocharger that includes a compressor arranged in an intake passage of the internal combustion engine, and a turbine arranged in an exhaust passage of the internal combustion engine; a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor; a low-pressure EGR valve that is provided in the low-pressure EGR passage, and that changes the flow passage area of the low-pressure EGR passage; a determination unit that determines whether the internal combustion engine is under a predetermined low-temperature environment; and a valve control unit that executes an opening/closing control over the low-pressure EGR valve. When the determination unit determines that the internal combustion engine is under the predetermined low-temperature environment, the valve control unit keeps the low-pressure EGR valve closed while the operation mode of the internal combustion engine is the fuel-supply cutoff operation mode.

When the internal combustion engine is under the predetermined low-temperature environment, inconveniences such as incomplete combustion and an increase in the discharge amount of hydrocarbon (HC) may occur when the operation mode of the internal combustion engine is switched from the fuel-supply cutoff operation mode to the normal operation mode. As a parameter used to determine whether the internal combustion engine is under the low-temperature environment, the temperature of a coolant in the internal combustion engine, the atmospheric temperature, whether the internal combustion engine is being started while it is cold, or the time that has elapsed since the internal combustion engine is stopped may be used. For example, when the temperature of the coolant in the internal combustion engine is lower than a predetermined temperature, it is determined that the internal combustion engine is under the low-temperature environment. The predetermined temperature may be set to the lower limit of the coolant temperature range in which inconveniences such as incomplete combustion and an increase in the discharge amount of hydrocarbon (HC) do not occur when the operation mode of the internal combustion engine is switched from the fuel-supply cutoff operation mode to the normal operation mode. Alternatively, the predetermined temperature may be set to a value that is lower than the lower limit of the coolant temperature range by a predetermined amount.

Instead of this, it may be determined that the internal combustion engine is under the low-temperature environment, when the atmospheric temperature is lower than a predetermined temperature, when the internal combustion engine is being started while it is cold, or when the time that has elapsed since the internal combustion engine is stopped is longer than a predetermined value.

With the configuration described above, when the operation mode is switched to the fuel-supply cutoff operation mode while the internal combustion engine is under the low-temperature environment, the low-pressure EGR valve is closed. Therefore, scavenging of the low-temperature air (newly-taken air) through the low-pressure EGR passage during the fuel-supply cutoff operation is suppressed. During the fuel-supply cutoff operation, the high-temperature exhaust gas that is discharged from the internal combustion engine immediately before the operation mode is switched to the fuel-supply cutoff operation mode remains in the low-pressure EGR passage.

Thus, it is possible to suppress cooling of the low-pressure EGR passage during the fuel-supply cutoff operation. In addition, it is possible to suppress inflow of the low-temperature air into the intake system when the operation mode is switched from the fuel-supply cutoff operation mode to the normal operation mode. As a result, it is possible to suppress occurrence of inconveniences such as incomplete combustion and an increase in the discharge amount of hydrocarbon (HC) when the fuel-supply cutoff operation ends.

The first aspect of the invention may be applied to an exhaust gas control system which has the above-described configuration and which further includes a first throttle valve that is provided in the intake passage, at a position upstream of a connection portion at which the low-pressure EGR passage is connected to the intake passage, and that changes the flow passage area of the intake passage.

In this case, a valve control unit executes an opening/closing control over the first throttle valve in addition to the low-pressure EGR valve. When the determination unit determines that the internal combustion engine is under the predetermined low-temperature environment, the valve control unit keeps at least one of the low-pressure EGR valve and the first throttle valve closed while the operation mode of the internal combustion engine is the fuel-supply cutoff operation mode.

With the configuration described above, when the low-pressure EGR valve is kept closed, it is possible to suppress scavenging of the low-temperature air through the low-pressure EGR passage during the fuel-supply cutoff operation, independently of whether the first throttle valve is open or closed. Therefore, it is possible to suppress cooling of the low-pressure EGR passage during the fuel-supply cutoff operation. As a result, it is possible to suppress occurrence of inconveniences such as incomplete combustion and an increase in the discharge amount of hydrocarbon (HC) when the fuel-supply cutoff operation ends.

When the first throttle valve is kept closed, it is possible to suppress inflow of the low-temperature air (newly-taken air) into the intake passage during the fuel-supply cutoff operation. Therefore, it is possible to suppress scavenging of the low-temperature air through the intake passage and the low-pressure EGR passage, independently of whether the low-pressure EGR valve is open or closed. Thus, it is possible to suppress scavenging of the low-temperature air through the intake passage and the low-pressure EGR passage during the fuel-supply cutoff operation. As a result, it is possible to suppress occurrence of the situation where the low-temperature air is taken in the internal combustion engine when the operation mode is switched from the fuel-supply cutoff operation to the normal operation, resulting in inconveniences such as incomplete combustion and an increase in the discharge amount of hydrocarbon (HC).

In the configuration described above, the valve control unit may keep both the low-pressure EGR valve and the first throttle valve closed. In this case as well, cooling of the low-pressure EGR passage is suppressed because the high-temperature exhaust gas remains in the low-pressure EGR passage during the fuel-supply cutoff operation. Also, cooling of the intake passage due to the low-temperature air is suppressed. Therefore, as in the case described above, it is possible to suppress occurrence of inconveniences such as incomplete combustion and an increase in the discharge amount of hydrocarbon (HC) when the operation mode is switched from the fuel-supply cutoff operation mode to the normal operation mode.

In the configuration described above, when the valve control unit keeps the low-pressure EGR valve open and the first throttle valve closed, communication is provided between the intake passage and the low-pressure EGR passage. Accordingly, during the fuel-supply cutoff operation, the high-temperature exhaust gas, which is discharged from the internal combustion engine immediately before the operation mode is switched to the fuel-supply cutoff operation mode, remains in the low-pressure EGR passage and the intake passage at a portion downstream of the first throttle valve.

Thus, it is possible to suppress cooling of the low-pressure EGR passage during the fuel-supply cutoff operation, and cooling of the intake passage at a portion downstream of the first throttle valve, and the intercooler, the compressor of the turbocharger, etc, arranged in the intake passage. Also, it is possible to suppress inflow of the low-temperature air in the intake system when the operation mode is switched from the fuel-supply cutoff operation mode to the normal operation mode. As a result, it is possible to suppress occurrence of inconveniences such as incomplete combustion and an increase in the discharge amount of hydrocarbon (HC) when the fuel-supply cutoff operation ends.

Hereinafter, the control for closing the low-pressure EGR valve in the configuration including the low-pressure EGR valve or the control for closing at least one of the low-pressure EGR valve and the first throttle valve in the configuration including the low-pressure EGR valve and the first throttle valve when the operation mode is switched to the fuel-supply cutoff operation mode in the case where the internal combustion engine is under the low-temperature environment will be referred to as the basic valve control.

The first aspect of the invention described above may be applied to an exhaust gas control system which has the above-described configuration, and which further includes a high-pressure EGR unit that recirculates a portion of the exhaust gas back to the internal combustion engine through a high-pressure EGR passage that provides communication between the exhaust passage, at a portion upstream of the turbine, and the intake passage, at a portion downstream of the compressor; and a high-pressure EGR valve that is provided in the high-pressure EGR passage, and that changes the flow passage area of the high-pressure EGR passage.

In this case, the valve control unit executes the opening/closing control over the high-pressure EGR valve in addition to the low-pressure EGR valve or in addition to the low-pressure EGR valve and the first throttle valve. When the determination unit determines that the internal combustion engine is under the predetermined low-temperature environment, the valve control unit keeps the high-pressure EGR valve closed in addition to executing the basic valve control while the operation mode of the internal combustion engine is the fuel-supply cutoff operation mode.

Thus, it is possible to suppress scavenging of the low-temperature air through the high-pressure EGR passage during the fuel-supply cutoff operation that is performed when the internal combustion engine is under the low-temperature environment. Therefore, it is possible to suppress cooling of the high-pressure EGR passage in addition to the intake passage at a portion downstream of the first throttle valve and the low-pressure EGR passage. Accordingly, it is possible to suppress inflow of the low-temperature air from the high-pressure EGR passage into the internal combustion engine when the fuel-supply cutoff operation ends. As a result, it is possible to suppress occurrence of inconveniences such as incomplete combustion and an increase in the discharge amount of hydrocarbon (HC).

The first aspect of the invention may be applied to an exhaust gas control system which has the above-described configuration and which further includes a second throttle valve that is provided in the intake passage, at a position upstream of a connection portion at which the high-pressure EGR passage is connected to the intake passage and downstream of the compressor, and that changes the flow passage area of the intake passage.

In this case, the valve control unit executes the opening/closing control over the high-pressure EGR valve and the second throttle valve in addition to the low-pressure EGR valve or in addition to the low-pressure EGR valve and the first throttle valve. When the determination unit determines that the internal combustion engine is under the predetermined low-temperature environment, the valve control unit keeps at least one of the high-pressure EGR valve and the second throttle valve closed in addition to executing the basic valve control while the operation mode of the internal combustion engine is the fuel-supply cutoff operation mode.

In the configuration described above, when the high-pressure EGR valve is kept closed, it is possible to suppress scavenging of the low-temperature air through the high-pressure EGR passage during the fuel-supply cutoff operation, independently of whether the second throttle valve is open or closed. Also, the high-temperature exhaust gas that is discharged from the internal combustion engine immediately before the operation mode is switched to the fuel-supply cutoff operation mode remains in the high-pressure EGR passage. Therefore, it is possible to suppress cooling of the high-pressure EGR passage during the fuel-supply cutoff operation. Thus, it is possible to appropriately suppress incomplete combustion and an increase in hydrocarbon (HC) that are likely to occur when the fuel-supply cutoff operation ends.

Also, when the second throttle valve is kept closed, it is possible to suppress inflow of the low-temperature air into the intake passage at a portion downstream of the second throttle valve during the fuel-supply cutoff operation, independently of whether the first throttle valve is open or closed. Therefore, it is possible to suppress scavenging of the low-temperature air through the high-pressure EGR passage and the intake passage at a portion downstream of the second throttle valve, independently of whether the high-pressure EGR valve is open or closed. As a result, it is possible to suppress occurrence of the situation where the low-temperature air is taken into the internal combustion engine when the operation mode is switched from the fuel-supply cutoff operation mode to the normal operation mode, resulting in inconveniences such as incomplete combustion and an increase in the discharge amount of hydrocarbon (HC).

In the configuration described above, the valve control unit may keep both the high-pressure EGR valve and the second throttle valve closed. In this case as well, it is possible to suppress cooling of the high-pressure EGR passage because the high-temperature exhaust gas remains in the high-pressure EGR passage during the fuel-supply cutoff operation. Also, it is possible to suppress cooling of the intake passage at a portion downstream of the second throttle valve due to the low-temperature air. Therefore, as in the above-described case, it is possible to suppress occurrence of inconveniences such as incomplete combustion and an increase in the discharge amount of hydrocarbon (HC) when the operation mode is switched from the fuel-supply cutoff operation mode to the normal operation mode.

In the configuration described above, when the valve control unit keeps the high-pressure EGR valve open and the second throttle valve closed in addition to executing the basic valve control, communication is provided between the intake passage at a portion downstream of the second throttle valve and the high-pressure EGR passage. Therefore, during the fuel-supply cutoff operation, the high-temperature exhaust gas that is discharged from the internal combustion engine immediately before the operation mode is switched to the fuel-supply cutoff operation mode is present in the high-pressure EGR passage and the intake passage at a portion downstream of the second throttle valve.

Thus, it is possible to suppress cooling of the high-pressure EGR passage during the fuel-supply cutoff operation. Also, it is possible to suppress cooling of the intake passage at a portion downstream of the second throttle valve. Therefore, it is possible to appropriately suppress occurrence of inconveniences such as incomplete combustion and an increase in the discharge amount of hydrocarbon (HC) when the fuel-supply cutoff operation mode ends.

In the configuration according to the first aspect of the invention, which further includes high-pressure EGR unit, the high-pressure EGR valve and the second throttle valve, the valve control unit may keep the first throttle valve closed in the basic valve control, and keep the high-pressure EGR valve and the second throttle valve open. In this case, because the first throttle valve is kept closed, it is possible to suppress scavenging of the low-temperature air (newly-taken air) through the intake passage at a portion downstream of the first throttle valve, the low-pressure EGR passage, and the high-pressure EGR passage during the fuel-supply cutoff operation. Therefore, it is possible to suppress cooling of the high-pressure EGR passage in addition to the intake passage at a portion downstream of the first throttle valve and the low-pressure EGR passage.

In the configuration according to the first aspect of the invention, which further includes the high-pressure EGR unit and the first throttle valve, the valve control unit may keep one of the first throttle valve and the low-pressure EGR valve open in the basic valve control, and keep the second throttle valve open.

When the valve control unit keeps the first throttle valve open and the low-pressure EGR valve closed in the basic valve control, and keeps the second throttle valve open, it is possible to suppress cooling of the low-pressure EGR passage during the fuel-supply cutoff operation. In addition, because the first throttle valve and the second throttle valve are kept open, an airflow is produced in the intake passage during the fuel-supply cutoff operation, and the compressor rotates. Thus, the turbocharger is operated at a relatively low rotational speed even during the fuel-supply cutoff operation. Accordingly, it is possible to rapidly increase the supercharging pressure produced by the turbocharger when the operation mode is switched from the fuel-supply cutoff operation mode to the normal operation mode. In this case, if the high-pressure EGR valve is kept closed, it is possible to suppress cooling of the high-pressure EGR passage during the fuel-supply cutoff operation.

On the other hand, when the valve control unit keeps the first throttle valve closed and the low-pressure EGR valve open in the basic valve control, and keeps the second throttle valve open, it is possible to suppress cooling of the low-pressure EGR passage, the intake passage at a portion downstream of the first throttle valve, and the compressor, the intercooler, etc, arranged in the intake passage during the fuel-supply cutoff operation, as described above. In addition, because the second throttle valve is kept open, a gas flow directed from the low-pressure EGR passage to the intake passage is produced, and the compressor rotates. Thus, the turbocharger is operated at a relatively low rotational speed even during the fuel-supply cutoff operation as in the above-described case. Therefore, it is possible to rapidly increase the supercharging pressure when the operation mode is switched from the fuel-supply cutoff operation mode to the normal operation mode. In this case, the first throttle valve is kept closed and inflow of the low-temperature newly-take air into the intake passage is suppressed. Therefore, it is possible to appropriately suppress incomplete combustion and an increase in the discharge amount of hydrocarbon (HC) that are likely to occur when the fuel-supply cutoff operation ends.

Also, in the configuration in which the turbocharger is able to operate at a relatively low rotational speed during the fuel-supply cutoff operation, formation of a negative pressure in the intake passage is suppressed, because a gas flow is produced in the intake passage even during the fuel-supply cutoff operation as described above. Thus, even when a blow-by gas pipe is connected to the intake passage, inflow of the oil from the blow-by gas pipe is suppressed.

Even when the valve control unit keeps the high-pressure EGR valve open and the second throttle valve closed in addition to executing the basic valve control, formation of a negative pressure in the intake passage during the fuel-supply cutoff operation is suppressed.

The configurations described above may be appropriately combined with each other.

A second aspect of the invention relates to a method for controlling an exhaust gas control system for an internal combustion engine. The exhaust gas control system includes a turbocharger that includes a compressor arranged in an intake passage of the internal combustion engine, and a turbine arranged in an exhaust passage of the internal combustion engine; a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor; and a low-pressure EGR valve that is provided in the low-pressure EGR passage, and that changes the flow passage area of the low-pressure EGR passage. According to the method, it is determined whether the internal combustion engine is under a predetermined low-temperature environment. An opening/closing control is executed over the low-pressure EGR valve. When it is determined that the internal combustion engine is under the predetermined low-temperature environment, the low-pressure EGR valve is kept closed while the operation mode of the internal combustion engine is the fuel-supply cutoff operation mode.

With the exhaust gas control system and the method for controlling the exhaust gas control system according to the aspects of the invention described above, it is possible to suppress occurrence of inconveniences such as incomplete combustion and an increase in the discharge amount of hydrocarbon (HC) when the operation mode is switched from the fuel-supply cutoff operation mode to the normal operation mode under the low-temperature environment, while suppressing a reduction in ease of mounting the internal combustion engine on a vehicle and an increase in cost.

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein:

FIG. 3 is a table showing the basic valve control pattern of the valve control according to the embodiment of the invention;

FIG. 4 is a table showing an example of the valve control pattern according to the embodiment of the invention;

FIG. 5 is a table showing another example of the valve control pattern according to the embodiment of the invention;

FIG. 6 is a table showing another example of the valve control pattern according to the embodiment of the invention;

FIG. 7 is a table showing another example of the valve control pattern according to the embodiment of the invention; and FIG. 8 is a flowchart showing the valve control routine according to the embodiment of the invention.

DETAILED DESCRIPTION OF THE EXAMPLE EMBODIMENT

Hereafter, an example embodiment of the invention will be described in detail with reference to the accompanying drawings. Unless otherwise noted, the sizes, materials, shapes, relative arrangements, etc. of the components described in the embodiment are not intended to limit the technical scope of the invention.

Figure 1:
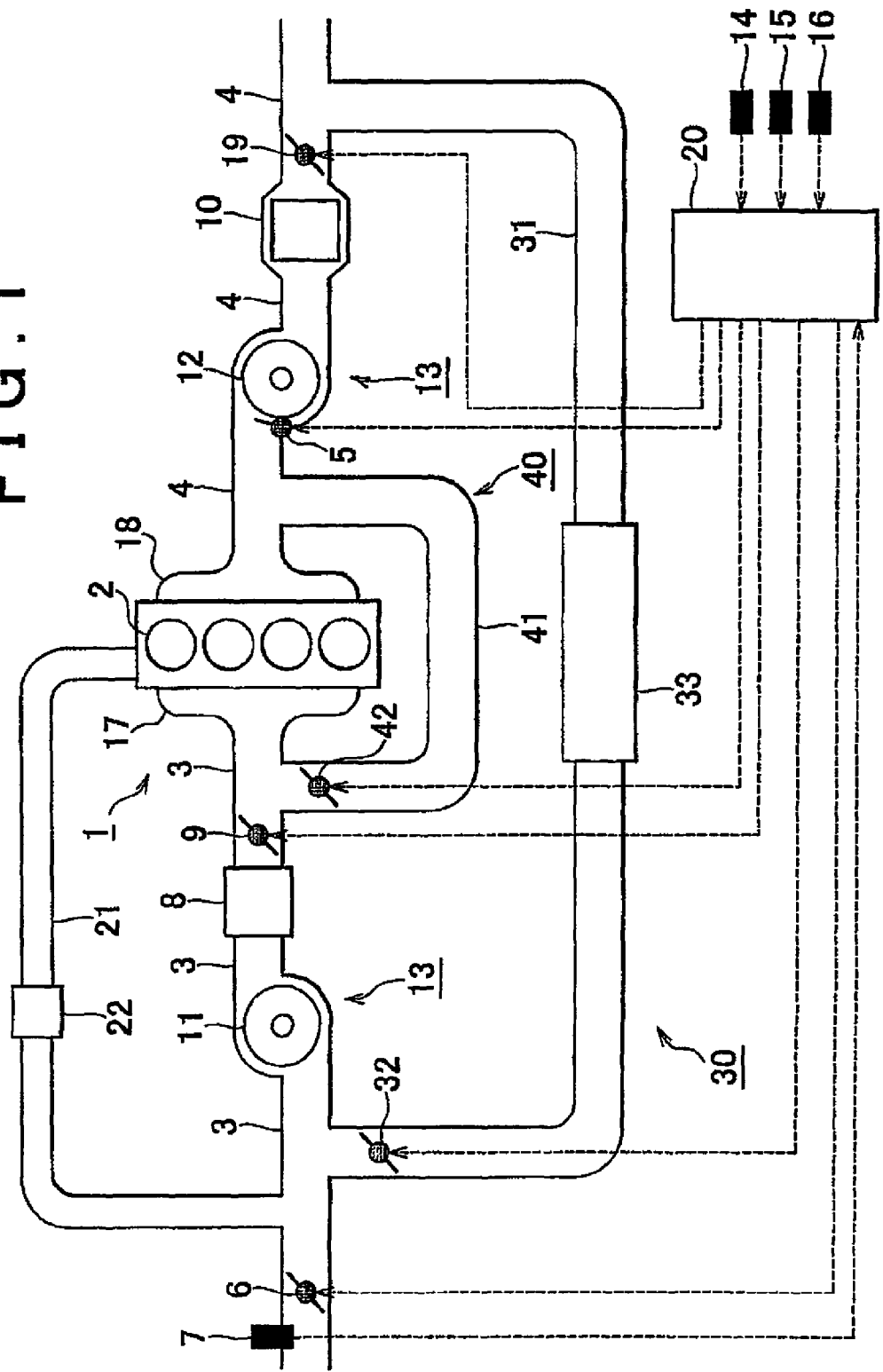
FIG. 1 is a view schematically showing an internal combustion engine provided with an exhaust gas control system for an internal combustion engine according to an embodiment of the invention, and an intake system and an exhaust system of the internal combustion engine.

FIG. 1 is a view schematically showing an internal combustion engine provided with an exhaust gas control system for an internal combustion engine according to an embodiment of the invention, and an intake system and an exhaust system of the internal combustion engine. An internal combustion engine 1 shown in FIG. 1 is a water-cooled four-cycle diesel engine having four cylinders 2.

An intake manifold 17 is connected to the cylinders 2 of the internal combustion engine 1 via respective intake ports (not shown). An intake pipe 3, which serves as an intake passage according to the invention, is connected to the intake manifold 17. A second throttle valve 9, which regulates the flow rate of the intake air flowing through the intake pipe 3, is provided in the intake pipe 3 at a position upstream of the intake manifold 17. An intercooler 8 that cools the intake air is provided in the intake pipe 3, at a position upstream of the second throttle valve 9. A turbocharger 13 is provided to operate using the energy of the exhaust gas as a driving source. A compressor 11 of the turbocharger 13 is provided in the intake pipe 3, at a position upstream of the intercooler 8. A low-pressure EGR passage 31 is connected to the intake pipe 3, at a position upstream of the compressor 11. A blow-by gas pipe 21, through which the blow-by gas in a crankcase (not shown) of the internal combustion engine 1 is introduced into the intake pipe 3, is connected to the intake pipe 3, at a position upstream of the connection portion at which the low-pressure EGR passage 31 is connected to the intake pipe 3. A blow-by oil catcher tank 22 that stores the oil (lubrication oil) contained in the blow-by gas is provided at the middle portion of the blow-by gas pipe 21. A first throttle valve 6, which regulates the flow rate of the intake air flowing into the intake pipe 3, is provided in the intake pipe 3, at a position upstream of the connection portion at which the blow-by gas pipe 21 is connected to the intake pipe 3.

An exhaust manifold 18 is connected to the cylinders 2 of the internal combustion engine 1 via respective exhaust ports (not shown). An exhaust pipe 4, which serves as an exhaust passage according to the invention, is connected to the exhaust manifold 18. A turbine 12 of the turbocharger 13 is provided in the exhaust pipe 4. The turbocharger 13 is a variable capacity turbocharger provided with a nozzle vane 5 that is able to change the flow characteristics of the exhaust gas that flows into the turbine 12. An exhaust gas control apparatus 10 is provided in the exhaust pipe 4, at a position downstream of the turbine 12. The exhaust gas control apparatus 10 includes a particulate filter (hereinafter, referred to as a "filter"), and a NOx storage reduction catalyst that removes NOx in the exhaust gas. The filter traps particulate matter contained in the exhaust gas. The NOx storage reduction catalyst is supported on the filter. When the exhaust gas is in the oxidation atmosphere, the NOx storage reduction catalyst stores NOx in the exhaust gas. When the exhaust gas is in the reduction atmosphere, the NOx storage reduction catalyst releases and reduces the NOx. An exhaust throttle valve 19, which regulates the flow rate of the exhaust gas flowing through the exhaust pipe 4, is provided in the exhaust pipe 4, at a position downstream of the exhaust gas control apparatus 10. The exhaust gas throttle valve 19 may be provided in the exhaust pipe 4, at a position downstream of the connection portion at which the low-pressure EGR passage 31, which will be described later in detail, is connected to the exhaust pipe 4.

The internal combustion engine 1 is provided with a high-pressure EGR unit 40, which serves as a high-pressure EGR unit according to the invention. The high-pressure EGR unit 40 introduces a portion of the exhaust gas flowing through the exhaust pipe 4 to the intake pipe 3, at high pressure, to recirculate it back to the cylinders 2. The high-pressure EGR unit 40 includes a high-pressure EGR passage 41, and a high-pressure EGR valve 42. The high-pressure EGR passage 41 provides communication between the exhaust pipe 4, at a portion upstream of the turbine 12, and the intake pipe 3, at a portion downstream of the second throttle valve 9. A portion of the exhaust gas is introduced to the intake pipe 3 through the high-pressure EGR passage 41. In the following description concerning the embodiment of the invention, the exhaust gas that is recirculated back to the cylinders 2 through the high-pressure EGR passage 41 will be referred to as the "high-pressure EGR gas".

The high-pressure EGR valve 42 is a flow-rate regulating valve that regulates the flow rate of the exhaust gas flowing through the high-pressure EGR passage 41. The flow rate of the high-pressure EGR gas is regulated by adjusting the opening amount of the high-pressure EGR valve 42. The flow rate of the high-pressure EGR gas may be regulated in a method in which the pressure difference between the upstream side and the downstream side of the high-pressure EGR passage 41 is changed by adjusting the opening amount of the second throttle valve 9. The flow rate of the high-pressure EGR gas may be regulated by adjusting the opening amount of the nozzle vane 5.

The internal combustion engine 1 is provided with a low-pressure EGR unit 30, which serves as a low-pressure EGR unit according to the invention. The low-pressure EGR unit 30 introduces a portion of the exhaust gas, flowing through the exhaust pipe 4, to the intake pipe 3, at a low pressure, to recirculate it back to the cylinders 2. The low-pressure EGR unit 30 includes the low-pressure EGR passage 31, a low-pressure EGR valve 32 and a low-pressure EGR cooler 33. The low-pressure EGR passage 31 provides communication between the exhaust pipe 4, at a portion downstream of the exhaust throttle valve 19, and the intake pipe 3, at a portion upstream of the compressor 11 and downstream of the first throttle valve 6. A portion of the exhaust gas is introduced to the intake pipe 3 through the low-pressure EGR passage 31. In the following description concerning the embodiment of the invention, the exhaust gas that is recirculated back to the cylinders 2 through the low-pressure EGR passage 31 will be referred to as the "low-pressure EGR gas".

The low-pressure EGR valve 32 is a flow-rate regulating valve that regulates the flow rate of the exhaust gas flowing through the low-pressure EGR passage 31. The flow rate of the low-pressure EGR gas is regulated by adjusting the opening amount of the low-pressure EGR valve 32. The flow rate of the low-pressure EGR gas may be regulated in a method in which the pressure difference between the upstream side and the downstream side of the low-pressure EGR passage 31 is changed by adjusting the opening amount of the first throttle valve 6. The low-pressure EGR cooler 33 cools the low-pressure EGR gas that flows through the low-pressure EGR passage 31.

The internal combustion engine 1 is provided with an electronic control unit (ECU) 20 that controls the internal combustion engine 1. The ECU 20 is a microcomputer that has a known structure in which a read only memory (ROM), a random access memory (RAM), a central processing unit (CPU), an input port, an output port, a digital-analog converter (DA converter), an analog-digital converter (AD converter), etc. are connected to each other via a bi-directional bus.

The ECU 20 executes various known basic valve controls for a diesel engine, such as the fuel injection control, based on the operation mode of the internal combustion engine 1 and an instruction from a driver. Therefore, the internal combustion engine 1 in the embodiment of the invention is provided with an airflow meter 7 that detects the flow rate of the newly-taken air flowing through the intake pipe 3, a coolant temperature sensor 14 that detects the temperature of the coolant in the internal combustion engine 1, an accelerator angle sensor 15 that detects the amount by which an accelerator pedal is depressed by the driver (accelerator angle), a crank position sensor 16 that detects the rotational phase (crank angle) of a crankshaft of the internal combustion engine 1, and various sensors (not shown) that are usually provided to a diesel engine.

These sensors are connected to the ECU 20 via electric wiring, and signals output from these sensors are transmitted to the ECU 20. Devices such as drive units that drive the first throttle valve 6, the second throttle valve 9, the exhaust throttle valve 19, the low-pressure EGR valve 32, and the high-pressure EGR valve 42 are connected to the ECU 20 via electric wiring. These devices are controlled according to control signals transmitted from the ECU 20.

The ECU 20 determines the operation mode of the internal combustion engine 1 and the instruction from the driver based on the values detected by these sensors. For example, the ECU 20 detects the operation mode of the internal combustion engine 1 based on the engine speed, which is determined based on the crank angle indicated by a signal from the crank position sensor 16, and the engine load, which is determined based on the accelerator angle indicated by a signal from the accelerator angle sensor 15. Then, the ECU 20 controls the low-pressure EGR valve 32, the high-pressure EGR valve 42, etc. based on the detected engine operation mode and instruction from the driver, thereby controlling the EGR gas amount, the intake air amount, etc.

Next, the EGR control executed by the ECU 20 will be described.

Figure 2:
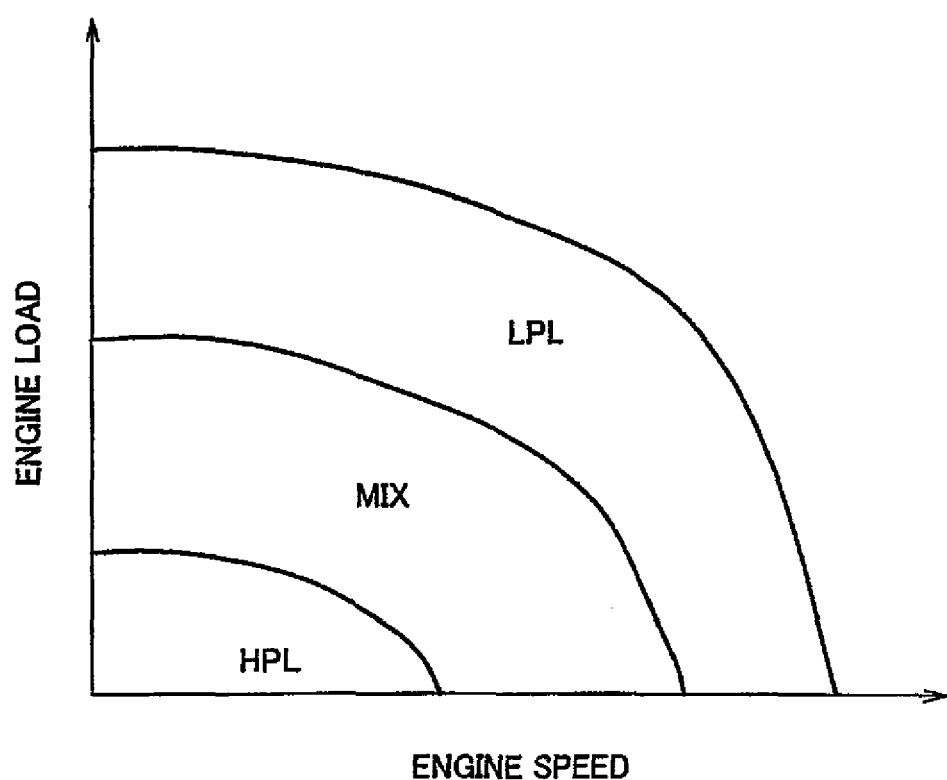
FIG. 2 is a graph showing the EGR control map according to the embodiment of the invention.

FIG. 2 is a graph showing the manner in which the EGR unit used for EGR is selected from among the high-pressure EGR unit 40 and the low-pressure EGR unit 30, which is set for each operating range of the internal combustion engine 1. In FIG. 2, the abscissa axis of the graph represents the rotational speed of the internal combustion engine 1, and the ordinate axis of the graph represents the load placed on the internal combustion engine 1.

As shown in FIG. 2, according to the embodiment of the invention, when the internal combustion engine 1 is operating at low load, EGR is performed using only the high-pressure EGR unit 40. This operating range in which EGR is performed using only the high-pressure EGR unit 40 is referred to as the range HPL. When the internal combustion engine 1 is operating at medium load, EGR is performed using the high-pressure EGR unit 40 and the low-pressure EGR unit 30 in combination. This operating range in which EGR is performed using the high-pressure EGR unit 40 and the low-pressure EGR unit 30 in combination is referred to as the range MIX. When the internal combustion engine 1 is operating at high load, EGR is performed using only the low-pressure EGR unit 30. This operating range in which EGR is performed using only the low-pressure EGR unit 30 is referred to as the range LPL.

In the EGR control map shown in FIG. 2, the operating range of the internal combustion engine 1 is divided into three ranges, that is, the range HPL, the range MIX, and the range LPL. However, the method for dividing the operating range of the internal combustion engine is not limited to this. For example, an EGR control map in which the low-load range is defined as the range HPL, and the high-load range other than the range HPL is defined as the range LPL may be employed. Alternatively, an EGR control map in which the low-load range is defined as the range MIX and the high-load range other than the range MIX is defined as the range LPL may be employed.

The concrete operation modes of the internal combustion engine 1, which define the range LPL, the range MIX, and the range HPL, and the target values of the various parameters related to the EGR control such as the high-pressure EGR gas amount, the low-pressure EGR gas amount, and the ratio of each of the high-pressure EGR gas amount and the low-pressure EGR gas amount to the total amount of the exhaust gas that is recirculated back to the internal combustion engine 1 by the low-pressure EGR unit 30 and the high-pressure EGR unit 40 (hereinafter, referred to as the "total EGR gas amount") in each operating range are determined in advance through, for example, experiments. The above-mentioned concrete operation modes and target values are determined in a manner such that the EGR rate (or the oxygen concentration) of the intake air matches the target EGR rate (or the target oxygen concentration) in each operation mode and the combustion characteristics in the internal combustion engine 1, the property of the exhaust gas, the fuel efficiency characteristics due to performance of EGR, etc. satisfy predetermined requirements. The target value of the thus determined high-pressure EGR gas amount will be referred to as the "reference high-pressure EGR gas amount". The target value of the thus determined low-pressure EGR gas amount will be referred to as the "reference low-pressure EGR gas amount".

Then, the opening amount of the low-pressure EGR valve 32, at which the low-pressure EGR gas amount matches the reference low-pressure EGR gas amount when the internal combustion engine 1 performs the steady operation, is determined and used as the reference low-pressure EGR valve opening amount. The opening amount of the high-pressure EGR valve 42, at which the high-pressure EGR gas amount matches the reference high-pressure EGR gas amount when the internal combustion engine 1 performs the steady operation, is determined and used as the reference high-pressure EGR valve opening amount. The reference low-pressure EGR valve opening amount and the reference high-pressure EGR valve opening amount are stored in the ROM of the ECU 20.

The ECU 20 reads the reference low-pressure EGR valve opening amount and the reference high-pressure EGR valve opening amount from the ROM based on the operation mode of the internal combustion engine 1. The ECU 20 controls the low-pressure EGR valve 32 so that the opening amount of the low-pressure EGR valve 32 matches the reference low-pressure EGR valve opening amount. The ECU 20 also controls the high-pressure EGR valve 42 so that the opening amount of the high-pressure EGR valve 42 matches the reference high-pressure EGR valve opening amount.

When the internal combustion engine 1 is under the low-temperature environment, for example, when the engine coolant temperature is low or when the atmospheric temperature is low, if the low-temperature air (newly-taken air) passes through the intake system that includes the intake passage 3, the intercooler 8, etc., or an EGR system that includes the high-pressure EGR passage 41, the low-pressure EGR passage 31, etc. during the fuel-supply cutoff operation, the low-temperature air is taken in the cylinders 2 when the operation mode is switched from the fuel-supply cutoff operation mode to the normal operation mode. As a result, the temperature of the intake air may excessively decrease, resulting in inconveniences such as incomplete combustion and an increase in the discharge amount of hydrocarbon (HC).

Because the low-pressure EGR passage 31 is relatively long, it takes relatively long time until the low-temperature gas that passes through the low-pressure EGR passage 31 during the fuel-supply cutoff operation is replaced with the exhaust gas that is discharged from the internal combustion engine 1 after the operation mode is switched from the fuel-supply cutoff operation mode to the normal operation mode. Therefore, the above-described inconveniences are likely to occur in the exhaust gas control system according to the embodiment of the invention, which is provided with the low-pressure EGR unit 30.

Therefore, according to the embodiment of the invention, the low-pressure EGR valve 32, the high-pressure EGR valve 42, the first throttle valve 6, and the second throttle valve 9 are controlled in such a manner that high-temperature EGR gas remains in the intake system and the EGR system, during the fuel-supply cutoff operation performed when the internal combustion engine 1 is under the low-temperature environment. In this way, it is possible to suppress occurrence of the situation where the temperature of the air taken in the cylinders 2 becomes excessively low when the operation mode of the internal combustion engine 1 is switched from the fuel-supply cutoff operation mode to the normal operation mode.

FIG. 3 is a table showing the control pattern of the valve control that is executed during the fuel-supply cutoff operation that is performed under the low-temperature environment according to the embodiment of the invention. In FIG. 3, THV1 denotes the first throttle valve 6, LPLV denotes the low-pressure EGR valve 32, THV2 denotes the second throttle valve 9, and HPLV denotes the high-pressure EGR valve 42.

According to the control pattern A in FIG. 3, during the fuel-supply cutoff operation that is performed under the low-temperature environment, the low-pressure EGR valve 32 is kept closed. In this case, it is possible to suppress at least scavenging of the low-temperature air (newly-taken air) through the low-pressure EGR passage 31 during the fuel-supply cutoff operation. During the fuel-supply cutoff operation, the high-temperature exhaust gas that is discharged from the internal combustion engine 1 immediately before the operation mode is switched to the fuel-supply cutoff operation mode remains in the low-pressure EGR passage 31.

Thus, cooling of the low-pressure EGR passage 31 during the fuel-supply cutoff operation is suppressed. In addition, it is possible to suppress inflow of the low-temperature air into the intake system, which is likely to occur when the operation mode is switched from the fuel-supply cutoff operation to the normal operation mode. Thus, it is possible to suppress occurrence of inconveniences such as incomplete combustion and an increase in the discharge amount of hydrocarbon (HC) when the fuel-supply cutoff operation ends.

In the control pattern A, the second throttle valve 9 and the high-pressure EGR valve 42 may be kept either open or closed. If the first throttle valve 6 is kept closed as shown by the control pattern A2 in FIG. 3, inflow of the low-temperature air into the intake passage 3 during the fuel-supply cutoff operation is suppressed. Accordingly, it is possible to suppress cooling of the intake passage 3, and the compressor 11, the intercooler 8, etc. which are provided in the intake passage 3.

According to the control pattern B in FIG. 3, the low-pressure EGR valve 32 is kept open and the first throttle valve 6 is kept closed during the fuel-supply cutoff operation that is performed under the low-temperature environment. At this time, the second throttle valve 9 and the high-pressure EGR valve 42 may be kept either open or closed. In this case, it is possible to suppress scavenging of the low-temperature air (newly-taken air) through the intake passage 3 at a portion downstream of the first throttle valve 6 and the low-pressure EGR passage 31 during the fuel-supply cutoff operation. In addition, because the low-pressure EGR valve 32 is kept open to provide communication between the intake passage 3 and the low-pressure EGR passage 31, the high-temperature exhaust gas that is discharged from the internal combustion engine 1 immediately before the operation mode is switched to the fuel-supply cutoff operation mode remains in the low-pressure EGR passage 31 and the intake passage 3 at a portion downstream of the first throttle valve 6.

Thus, cooling of the low-pressure EGR passage 31 during the fuel-supply cutoff operation is suppressed. In addition, it is possible to suppress cooling of the intake passage 3 at a portion downstream of the first throttle valve 6, and the compressor 11, the intercooler 8, etc. provided in the intake passage 3. Therefore, it is possible to suppress inflow of the low-temperature air into the intake system when the operation mode is switched from the fuel-supply cutoff operation to the normal operation mode. As a result, it is possible to suppress occurrence of inconveniences such as incomplete combustion and an increase in the discharge amount of hydrocarbon (HC) when the fuel-supply cutoff operation ends.

Hereinafter, the control pattern shown in FIG. 3 will be referred to as the "basic valve control pattern".

Next, the control pattern that differs from the basic valve control pattern shown in FIG. 3 will be described with reference to FIG. 4. The control pattern in FIG. 4 differs from the basic valve control pattern in FIG. 3 in that the high-pressure EGR valve 42 is kept closed.

According to the control patterns C and D, the high-pressure EGR valve 42 is kept closed during the fuel-supply cutoff operation that is performed under the low-temperature environment. Accordingly, even when the control for opening the first throttle valve 6 is executed according to the basic valve control pattern, scavenging of the low-temperature air (newly-taken air) through the high-pressure EGR passage 41 is suppressed. Then, the high-temperature exhaust gas that is discharged from the internal combustion engine 1 immediately before the operation mode is switched to the fuel-supply cutoff operation mode remains in the high-pressure EGR passage 41. Thus, it is possible to suppress cooling of the high-pressure EGR passage 41 during the fuel-supply cutoff operation.

The control pattern shown in FIG. 5 may be employed as the control pattern according to which cooling of the high-pressure EGR passage 41 during the fuel-supply cutoff operation is suppressed. The control pattern in FIG. 5 differs from the basic valve control pattern in FIG. 3 in that the high-pressure EGR valve 42 is kept open and the second throttle valve 9 is kept closed.

According to the control patterns E and F, communication is provided between the high-pressure EGR passage 41 and the intake passage 3 at a portion downstream of the second throttle valve 9 during the fuel-supply cutoff operation. Because the second throttle valve 9 is kept closed, it is possible to suppress inflow of the low-temperature air (newly-taken air) into the intake passage 3 at a portion downstream of the second throttle valve 9 and the high-pressure EGR passage 41 even when the control for opening the first throttle valve 6 is executed according to the basic valve control pattern. Thus, it is possible to suppress cooling of the intake passage 3 at a portion downstream of the second throttle valve 9 and the high-pressure EGR passage 41 during the fuel-supply cutoff operation.

The control pattern shown in FIG. 6 may be employed as the control pattern according to which cooling of the high-pressure EGR passage 41 during the fuel-supply cutoff operation is suppressed. The control patterns G and H in FIG. 6 differ from the patterns A2 and B other than the pattern A1, according to which the first throttle valve 6 is kept open, in the basic valve control pattern in FIG. 3 in that the high-pressure EGR valve 42 is kept open and the second throttle valve 9 is kept open.

According to the control pattern G, communication is provided between the high-pressure EGR passage 41 and the intake passage 3 at a portion downstream of the first throttle valve 6 during the fuel-supply cutoff operation. Because the first throttle valve 6 is kept closed, it is possible to suppress scavenging of the low-temperature air (newly-taken air) through the intake passage 3 at a portion downstream of the first throttle valve 6 and the high-pressure EGR passage 41 during the fuel-supply cutoff operation. Thus, it is possible to suppress cooling of the intake passage 3 at a portion downstream of the first throttle valve 6 and the high-pressure EGR passage 41 during the fuel-supply cutoff operation. At this time, if the low-pressure EGR valve 32 is kept open (control pattern H), communication through the low-pressure EGR passage 31 is permitted. As a result, it is possible to suppress cooling of the intake passage 3 at a portion downstream of the first throttle valve 6, the low-pressure EGR passage 31 and the high-pressure EGR passage 41 during the fuel-supply cutoff operation.

According to the control patterns shown in FIGS. 4 to 6, it is possible to more appropriately suppress not only cooling of the low-pressure EGR passage 31 but also cooling of the high-pressure EGR passage 41 during the fuel-supply cutoff operation that is performed under the low-temperature environment. Therefore, it is possible to more appropriately suppress incomplete combustion and an increase in the discharge amount of hydrocarbon (HC) which are likely to occur when the fuel-supply cutoff operation ends.

FIG. 7 shows the control pattern that differs from the various control patterns described above. The control patterns I and J in FIG. 7 differ from the control patterns A1 and B other than the control pattern A2, according to which the first throttle valve and the low-pressure EGR valve 32 are both kept closed, in FIG. 3 in that the second throttle valve 9 is kept open. In the control pattern in FIG. 7, the high-pressure EGR valve 42 may be kept either open or closed.

In the control pattern I, when the first throttle valve 6 is kept open, the low-pressure EGR valve 32 is kept closed, and the second throttle valve 9 is kept open, cooling of the low-pressure EGR passage 31 during the fuel-supply cutoff operation is suppressed by closing the low-pressure EGR valve 32. In addition, an airflow is produced in the intake passage 3 even during the fuel-supply cutoff operation by opening the first throttle valve 6 and the second throttle valve 9. As a result, the compressor 11 rotates.

Thus, the turbocharger 13 is operated at a relatively low rotational speed even during the fuel-supply cutoff operation. Therefore, the supercharging pressure generated by the turbocharger 13 increases more rapidly when the operation mode is switched from the fuel-supply cutoff operation mode to the normal operation mode. In the control pattern I, if the high-pressure EGR valve 42 is kept closed, it is possible to suppress cooling of the high-pressure EGR passage 41 during the fuel-supply cutoff operation.

In the control pattern J, when the first throttle valve 6 is kept closed, the low-pressure EGR valve 32 is kept open, and the second throttle valve 9 is kept open, it is possible to suppress cooling of the low-pressure EGR passage 31, the intake passage 3 at a portion downstream of the first throttle valve 6, and the compressor 11, the intercooler 8, etc. provided in the intake passage 3 during the fuel-supply cutoff operation, as described above. In addition, because the second throttle valve 9 is kept open, a gas flow directed from the low-pressure EGR passage 31 to the intake passage 3 is produced. As a result, the compressor 11 rotates.

Thus, as in the control pattern described above, the turbocharger 13 is operated at a relatively low rotational speed even during the fuel-supply cutoff operation. Therefore, the supercharging pressure increases more rapidly when the operation mode is switched from the fuel-supply cutoff operation mode to the normal operation mode. In the control pattern J, the first throttle valve 6 is kept closed and inflow of the low-temperature newly-take air into the intake passage 3 is suppressed. Accordingly, it is possible to more appropriately suppress incomplete combustion and an increase in the discharge amount of HC, which are likely to occur when the fuel-supply operation ends.

According to the control patterns I and J shown in FIG. 7, a gas flow is produced even during the fuel-supply cutoff operation. Accordingly, formation of a negative pressure in the intake passage 3 is suppressed. Thus, it is possible to suppress inflow of the oil into the intake passage 3 from the blow-by gas pipe 21 connected to the intake passage 3 during the fuel-supply cutoff operation. Even when any one of the control patterns E and F in FIG. 5 is employed, formation of a negative pressure in the intake passage 3 is suppressed.

Hereafter, the steps of the valve control according to the embodiment of the invention will be described. FIG. 8 is a flowchart showing the valve control routine according to the embodiment of the invention. The routine is periodically executed at predetermined time intervals during the operation of the internal combustion engine 1.

First, in step S101, the ECU 20 determines the coolant temperature Tw based on the value detected by the coolant temperature sensor 14 of the internal combustion engine 1.

Next, in step S102, the ECU 20 determines whether the coolant temperature Tw determined in step S101 is lower than the predetermined reference temperature Tw0. In this case, the reference temperature Tw0 is the lower limit of the coolant temperature range in which inconveniences such as incomplete combustion and an increase in the discharge amount of hydrocarbon (HC) do not occur when the operation mode is switched from the fuel-supply cutoff operation mode to the normal operation mode. The reference temperature Tw0 is determined in advance, for example, through experiments. In the embodiment of the invention, a determination unit according to the invention, which determines whether the internal combustion engine is under the low-temperature environment, is implemented by the coolant temperature sensor 14 and the ECU 20 that executes step S102.

When an affirmative determination is made in step S102, the ECU 20 executes step S103. On the other hand, when a negative determination is made in step S102, the ECU 20 ends the routine.

In step S103, the ECU 20 determines whether the internal combustion engine 1 is in the fuel-supply cutoff operation mode. When an affirmative determination is made in step S103, the ECU 20 executes step S104. On the other hand, when a negative determination is made in step S103, the ECU 20 ends the routine.

In step S104, the ECU 20 executes the opening/closing control over the first throttle valve 6, the second throttle valve 9, the low-pressure EGR valve 32 and the high-pressure EGR valve 42 according to the control pattern described above. In the embodiment of the invention, a valve control unit according to the invention is implemented by the ECU 20 that executes step S104.

The ECU 20 executes the valve control routine described above. Thus, if the operation mode is switched to the fuel-supply cutoff operation mode when the internal combustion engine 1 is under the low-temperature environment, one of the various control patterns described above is selected depending on the operation mode of the internal combustion engine 1, etc. and the opening/closing control over the first throttle valve 6, the second throttle valve 9, the low-pressure EGR valve 32 and the high-pressure EGR valve 42 is executed according to the selected control pattern. As a result, it is possible to suppress cooling of the intake system and the EGR system by the low-temperature air during the fuel-supply cutoff operation. Accordingly, it is possible to suppress occurrence of inconveniences such as incomplete combustion and an increase in the discharge amount of hydrocarbon (HC), which are likely to occur when the operation mode is switched from the fuel-supply cutoff operation mode to the normal operation mode.

While the invention has been described with reference to an example embodiment thereof, it is to be understood that the invention is not limited to the example embodiment. To the contrary, the invention is intended to cover various modifications and equivalent arrangements within the scope of the invention.

For example, in the embodiment of the invention, the pressure difference between the upstream side and the downstream side of the low-pressure EGR passage 31 is adjusted by changing the opening amount of the first throttle valve 6 to adjust the low-pressure EGR gas amount. Alternatively, an exhaust throttle valve may be provided in the exhaust pipe 4 at a position downstream of the connection portion at which the low-pressure EGR passage 31 is connected to the exhaust pipe 4, and the pressure difference between the upstream side and the downstream side of the low-pressure EGR passage 31 may be adjusted by changing the opening amount of the exhaust throttle valve to adjust the low-pressure EGR gas amount. With this configuration, the first throttle valve 6 according to the embodiment of the invention need not be provided in the intake pipe 3. Even with the configuration without the first throttle valve 6, it is possible to suppress cooling of the low-pressure EGR passage 31 during the fuel-supply cutoff operation by closing the low-pressure EGR valve 32 during the fuel-supply cutoff operation that is performed under the low-temperature environment. Accordingly, it is possible to appropriately suppress occurrence of inconveniences such as incomplete combustion and an increase in the discharge amount of HC, which are caused by inflow of the low-temperature gas into the internal combustion engine when the fuel-supply cutoff operation ends.

The valve control pattern need not be fixed to one of the valve control patterns described in the embodiment of the invention, and may be appropriately changed depending on the operation mode of the internal combustion engine, etc.

The invention claimed is:

1. A method for controlling an exhaust gas control system for an internal combustion engine,
   the exhaust gas control system including:
   a turbocharger that includes a compressor arranged in an intake passage of the internal combustion engine, and a turbine arranged in an exhaust passage of the internal combustion engine;
   a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor; and
   a low-pressure EGR valve that is provided in the low-pressure EGR passage, and that changes a flow passage area of the low-pressure EGR passage;
   the method, comprising:
   determining whether the internal combustion engine is under a predetermined low-temperature environment;
   executing an opening/closing control over the low-pressure EGR valve; and
   keeping the low-pressure EGR valve closed while an operation mode of the internal combustion engine is a fuel-supply cutoff operation mode, when it is determined that the internal combustion engine is under the predetermined low-temperature environment.

2. The method for controlling the exhaust gas control system according to claim 1, wherein the exhaust gas control system further includes:
   a high-pressure EGR unit that recirculates a portion of the exhaust gas back to the internal combustion engine through a high-pressure EGR passage that provides communication between the exhaust passage, at a portion upstream of the turbine, and the intake passage, at a portion downstream of the compressor; and
   a high-pressure EGR valve that is provided in the high-pressure EGR passage, and that changes a flow passage area of the high-pressure EGR passage,
   the method further comprising:
   executing the opening/closing control over the high-pressure EGR valve; and
   keeping the high-pressure EGR valve closed while the operation mode of the internal combustion engine is the fuel-supply cutoff operation mode, when it is determined that the internal combustion engine is under the predetermined low-temperature environment.

3. The method for controlling the exhaust gas control system according to claim 1, wherein the exhaust gas control system further includes:
   a high-pressure EGR unit that recirculates a portion of the exhaust gas back to the internal combustion engine through a high-pressure EGR passage that provides communication between the exhaust passage, at a portion upstream of the turbine, and the intake passage, at a portion downstream of the compressor;
   a high-pressure EGR valve that is provided in the high-pressure EGR passage, and that changes a flow passage area of the high-pressure EGR passage; and
   a second throttle valve that is provided in the intake passage, at a position upstream of a connection portion at which the high-pressure EGR passage is connected to the intake passage and downstream of the compressor, and that changes the flow passage area of the intake passage,
   the method further comprising:
   executing the opening/closing control over the high-pressure EGR valve and the second throttle valve; and
   keeping at least one of the high-pressure EGR valve and the second throttle valve closed while the operation mode of the internal combustion engine is the fuel-supply cutoff operation mode, when it is determined that the internal combustion engine is under the predetermined low-temperature environment.

4. The method according to claim 1, wherein whether the internal combustion engine is under the predetermined low-temperature environment is determined based on a temperature of a coolant in the internal combustion engine, an atmospheric temperature, whether the internal combustion engine is being started while the internal combustion engine is cold, or a time that has elapsed since the internal combustion engine is stopped.

5. A method for controlling an exhaust gas control system for an internal combustion engine,
   the exhaust gas control system including:
   a turbocharger that includes a compressor arranged in an intake passage of the internal combustion engine, and a turbine arranged in an exhaust passage of the internal combustion engine;
   a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;

a low-pressure EGR valve that is provided in the low-pressure EGR passage, and that changes a flow passage area of the low-pressure EGR passage; and a first throttle valve that is provided in the intake passage, at a position upstream of a connection portion at which the low-pressure EGR passage is connected to the intake passage, and that changes a flow passage area of the intake passage, the method comprising:

determining whether the internal combustion engine is under a predetermined low-temperature environment;

executing an opening/closing control over the low-pressure EGR valve and the first throttle valve; and keeping at least one of the low-pressure EGR valve and the first throttle valve closed while an operation mode of the internal combustion engine is a fuel-supply cutoff operation mode, when it is determined that the internal combustion engine is under the predetermined low-temperature environment.

6. The method for controlling the exhaust gas control system according to claim 5, wherein the exhaust gas control system further includes:

a high-pressure EGR unit that recirculates a portion of the exhaust gas back to the internal combustion engine through a high-pressure EGR passage that provides communication between the exhaust passage, at a portion upstream of the turbine, and the intake passage, at a portion downstream of the compressor; and a high-pressure EGR valve that is provided in the high-pressure EGR passage, and that changes a flow passage area of the high-pressure EGR passage, the method further comprising:

executing the opening/closing control over the high-pressure EGR valve; and keeping the high-pressure EGR valve closed while the operation mode of the internal combustion engine is the fuel-supply cutoff operation mode, when it is determined that the internal combustion engine is under the predetermined low-temperature environment.

7. The method for controlling the exhaust gas control system according to claim 5, wherein the exhaust gas control system further includes:

a high-pressure EGR unit that recirculates a portion of the exhaust gas back to the internal combustion engine through a high-pressure EGR passage that provides communication between the exhaust passage, at a portion upstream of the turbine, and the intake passage, at a portion downstream of the compressor;

a high-pressure EGR valve that is provided in the high-pressure EGR passage, and that changes a flow passage area of the high-pressure EGR passage; and a second throttle valve that is provided in the intake passage, at a position upstream of a connection portion at which the high-pressure EGR passage is connected to the intake passage and downstream of the compressor, and that changes the flow passage area of the intake passage, the method further comprising:

executing the opening/closing control over the high-pressure EGR valve and the second throttle valve; and keeping at least one of the high-pressure EGR valve and the second throttle valve closed while the operation mode of the internal combustion engine is the fuel-supply cutoff operation mode, when it is determined that the internal combustion engine is under the predetermined low-temperature environment.

8. The method for controlling the exhaust gas control system according to claim 5, wherein the exhaust gas control system further includes:

a high-pressure EGR unit that recirculates a portion of the exhaust gas back to the internal combustion engine through a high-pressure EGR passage that provides communication between the exhaust passage, at a portion upstream of the turbine, and the intake passage, at a portion downstream of the compressor;

a high-pressure EGR valve that is provided in the high-pressure EGR passage, and that changes a flow passage area of the high-pressure EGR passage; and a second throttle valve that is provided in the intake passage, at a position upstream of a connection portion at which the high-pressure EGR passage is connected to the intake passage and downstream of the compressor, and that changes the flow passage area of the intake passage, the method further comprising:

executing the opening/closing control over the high-pressure EGR valve and the second throttle valve; and keeping the first throttle valve closed, the second throttle valve open, and the high-pressure EGR valve open while the operation mode of the internal combustion engine is the fuel-supply cutoff operation mode, when it is determined that the internal combustion engine is under the predetermined low-temperature environment.

9. The method for controlling the exhaust gas control system according to claim 5, wherein the exhaust gas control system further includes:

a high-pressure EGR unit that recirculates a portion of the exhaust gas back to the internal combustion engine through a high-pressure EGR passage that provides communication between the exhaust passage, at a portion upstream of the turbine, and the intake passage, at a portion downstream of the compressor; and a second throttle valve that is provided in the intake passage, at a position upstream of a connection portion at which the high-pressure EGR passage is connected to the intake passage and downstream of the compressor, and that changes the flow passage area of the intake passage, the method further comprising:

executing the opening/closing control over the second throttle valve; and keeping one of the low-pressure EGR valve and the first throttle valve closed, the other of the low-pressure EGR valve and the first throttle valve open, and the second throttle valve open while the operation mode of the internal combustion engine is the fuel-supply cutoff operation mode, when it is determined that the internal combustion engine is under the predetermined low-temperature environment.

10. The method according to claim 5, wherein whether the internal combustion engine is under the predetermined low-temperature environment is determined based on a temperature of a coolant in the internal combustion engine, an atmospheric temperature, whether the internal combustion engine is being started while the internal combustion engine is cold, or a time that has elapsed since the internal combustion engine is stopped.

11. An exhaust gas control system for an internal combustion engine, comprising:
 a turbocharger that includes a compressor arranged in an intake passage of the internal combustion engine, and a turbine arranged in an exhaust passage of the internal combustion engine;
 a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;
 a low-pressure EGR valve that is provided in the low-pressure EGR passage, and that changes a flow passage area of the low-pressure EGR passage;
 a determination unit that determines whether the internal combustion engine is under a predetermined low-temperature environment; and
 a valve control unit that executes an opening/closing control over the low-pressure EGR valve,
 wherein,
 when the determination unit determines that the internal combustion engine is under the predetermined low-temperature environment, the valve control unit keeps the low-pressure EGR valve closed while an operation mode of the internal combustion engine is a fuel-supply cutoff operation mode.

12. The exhaust gas control system according to claim 11, further comprising:
 a high-pressure EGR unit that recirculates a portion of the exhaust gas back to the internal combustion engine through a high-pressure EGR passage that provides communication between the exhaust passage, at a portion upstream of the turbine, and the intake passage, at a portion downstream of the compressor; and
 a high-pressure EGR valve that is provided in the high-pressure EGR passage, and that changes a flow passage area of the high-pressure EGR passage,
 wherein
 the valve control unit executes the opening/closing control over the high-pressure EGR valve, and,
 when the determination unit determines that the internal combustion engine is under the predetermined low-temperature environment, the valve control unit keeps the high-pressure EGR valve closed while the operation mode of the internal combustion engine is the fuel-supply cutoff operation mode.

13. The exhaust gas control system according to claim 11, characterized by further comprising:
 a high-pressure EGR unit that recirculates a portion of the exhaust gas back to the internal combustion engine through a high-pressure EGR passage that provides communication between the exhaust passage, at a portion upstream of the turbine, and the intake passage, at a portion downstream of the compressor;
 a high-pressure EGR valve that is provided in the high-pressure EGR passage, and that changes a flow passage area of the high-pressure EGR passage; and
 a second throttle valve that is provided in the intake passage, at a position upstream of a connection portion at which the high-pressure EGR passage is connected to the intake passage and downstream of the compressor, and that changes the flow passage area of the intake passage,
 wherein
 the valve control unit executes the opening/closing control over the high-pressure EGR valve and the second throttle valve, and,
 when the determination unit determines that the internal combustion engine is under the predetermined low-temperature environment, the valve control unit keeps at least one of the high-pressure EGR valve and the second throttle valve closed while the operation mode of the internal combustion engine is the fuel-supply cutoff operation mode.

14. The exhaust gas control system according to claim 11, wherein whether the internal combustion engine is under the predetermined low-temperature environment is determined based on a temperature of a coolant in the internal combustion engine, an atmospheric temperature, whether the internal combustion engine is being started while the internal combustion engine is cold, or a time that has elapsed since the internal combustion engine is stopped.

15. An exhaust gas control system for an internal combustion engine, comprising:
 a turbocharger that includes a compressor arranged in an intake passage of the internal combustion engine, and a turbine arranged in an exhaust passage of the internal combustion engine;
 a low-pressure EGR unit that recirculates a portion of exhaust gas back to the internal combustion engine through a low-pressure EGR passage that provides communication between the exhaust passage, at a portion downstream of the turbine, and the intake passage, at a portion upstream of the compressor;
 a low-pressure EGR valve that is provided in the low-pressure EGR passage, and that changes a flow passage area of the low-pressure EGR passage;
 a first throttle valve that is provided in the intake passage, at a position upstream of a connection portion at which the low-pressure EGR passage is connected to the intake passage, and that changes a flow passage area of the intake passage;
 a determination unit that determines whether the internal combustion engine is under a predetermined low-temperature environment; and
 a valve control unit that executes an opening/closing control over the low-pressure EGR valve and the first throttle valve,
 wherein,
 when the determination unit determines that the internal combustion engine is under the predetermined low-temperature environment, the valve control unit keeps at least one of the low-pressure EGR valve and the first throttle valve closed while an operation mode of the internal combustion engine is a fuel-supply cutoff operation mode.

16. The exhaust gas control system according to claim 15, further comprising:
 a high-pressure EGR unit that recirculates a portion of the exhaust gas back to the internal combustion engine through a high-pressure EGR passage that provides communication between the exhaust passage, at a portion upstream of the turbine, and the intake passage, at a portion downstream of the compressor; and
 a high-pressure EGR valve that is provided in the high-pressure EGR passage, and that changes a flow passage area of the high-pressure EGR passage, wherein
the valve control unit executes the opening/closing control over the high-pressure EGR valve, and,
when the determination unit determines that the internal combustion engine is under the predetermined low-temperature environment, the valve control unit keeps the high-pressure EGR valve closed while the operation mode of the internal combustion engine is the fuel-supply cutoff operation mode.

17. The exhaust gas control system according to claim 15, characterized by further comprising:
a high-pressure EGR unit that recirculates a portion of the exhaust gas back to the internal combustion engine through a high-pressure EGR passage that provides communication between the exhaust passage, at a portion upstream of the turbine, and the intake passage, at a portion downstream of the compressor;
a high-pressure EGR valve that is provided in the high-pressure EGR passage, and that changes a flow passage area of the high-pressure EGR passage; and
a second throttle valve that is provided in the intake passage, at a position upstream of a connection portion at which the high-pressure EGR passage is connected to the intake passage and downstream of the compressor, and that changes the flow passage area of the intake passage,
wherein
the valve control unit executes the opening/closing control over the high-pressure EGR valve and the second throttle valve, and,
when the determination unit determines that the internal combustion engine is under the predetermined low-temperature environment, the valve control unit keeps at least one of the high-pressure EGR valve and the second throttle valve closed while the operation mode of the internal combustion engine is the fuel-supply cutoff operation mode.

18. The exhaust gas control system according to claim 15, characterized by further comprising:
a high-pressure EGR unit that recirculates a portion of the exhaust gas back to the internal combustion engine through a high-pressure EGR passage that provides communication between the exhaust passage, at a portion upstream of the turbine, and the intake passage, at a portion downstream of the compressor;
a high-pressure EGR valve that is provided in the high-pressure EGR passage, and that changes a flow passage area of the high-pressure EGR passage; and
a second throttle valve that is provided in the intake passage, at a position upstream of a connection portion at which the high-pressure EGR passage is connected to the intake passage and downstream of the compressor, and that changes the flow passage area of the intake passage,
wherein
the valve control unit executes the opening/closing control over the high-pressure EGR valve and the second throttle valve, and,
when the determination unit determines that the internal combustion engine is under the predetermined low-temperature environment, the valve control unit keeps the first throttle valve closed, the second throttle valve open, and the high-pressure EGR valve open while the operation mode of the internal combustion engine is the fuel-supply cutoff operation mode.

19. The exhaust gas control system according to claim 15, characterized by further comprising:
a high-pressure EGR unit that recirculates a portion of the exhaust gas back to the internal combustion engine through a high-pressure EGR passage that provides communication between the exhaust passage, at a portion upstream of the turbine, and the intake passage, at a portion downstream of the compressor; and
a second throttle valve that is provided in the intake passage, at a position upstream of a connection portion at which the high-pressure EGR passage is connected to the intake passage and downstream of the compressor, and that changes the flow passage area of the intake passage,
wherein
the valve control unit executes the opening/closing control over the second throttle valve, and,
when the determination unit determines that the internal combustion engine is under the predetermined low-temperature environment, the valve control unit keeps one of the low-pressure EGR valve and the first throttle valve closed, the other of the low-pressure EGR valve and the first throttle valve open, and the second throttle valve open while the operation mode of the internal combustion engine is the fuel-supply cutoff operation mode.

20. The exhaust gas control system according to claim 15, wherein whether the internal combustion engine is under the predetermined low-temperature environment is determined based on a temperature of a coolant in the internal combustion engine, an atmospheric temperature, whether the internal combustion engine is being started while the internal combustion engine is cold, or a time that has elapsed since the internal combustion engine is stopped.

* * * * *